Dec. 11, 1923. 1,477,417
C. A. BEGGS
DIRIGIBLE HEADLIGHT FOR AUTOMOBILES AND ANALOGOUS VEHICLES
Filed March 31, 1922
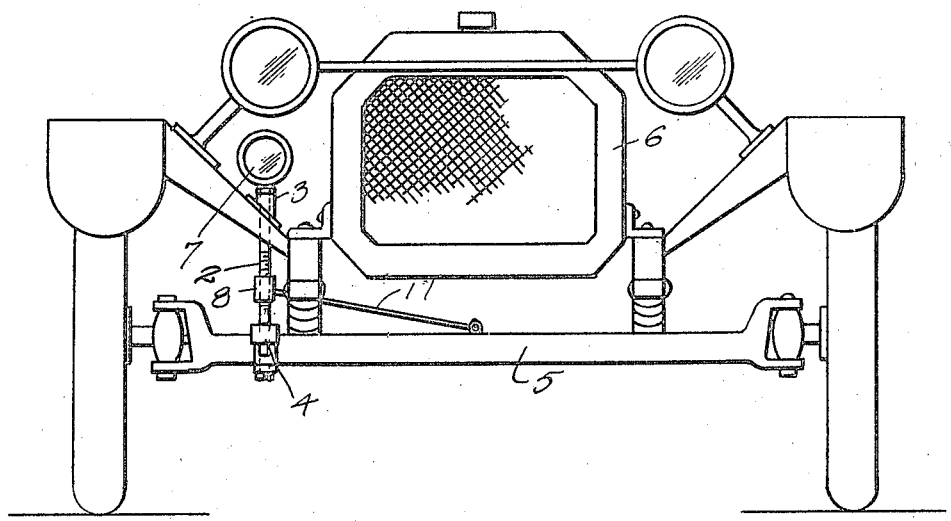
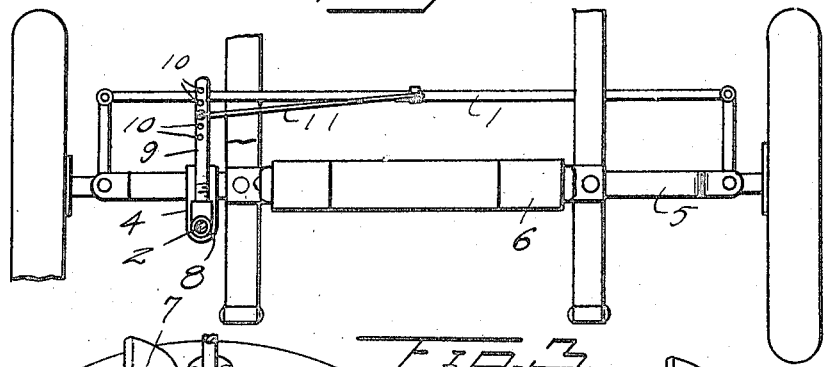
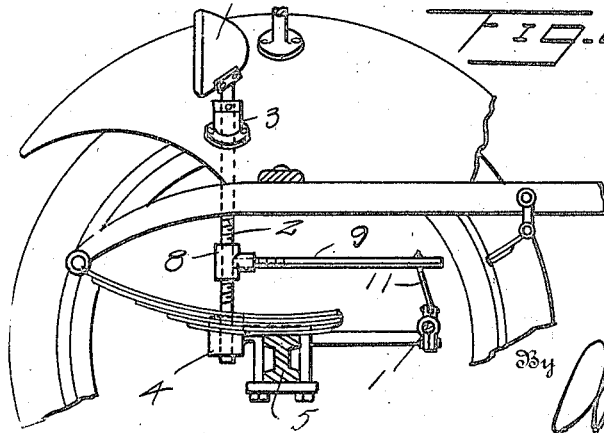

Patented Dec. 11, 1923.

1,477,417

UNITED STATES PATENT OFFICE.

CHARLES A. BEGGS, OF RICE LAKE, WISCONSIN.

DIRIGIBLE HEADLIGHT FOR AUTOMOBILES AND ANALOGOUS VEHICLES.

Application filed March 31, 1922. Serial No. 548,371.

*To all whom it may concern:*

Be it known that I, CHARLES A. BEGGS, a citizen of the United States, residing at Rice Lake, in the county of Barron and State of Wisconsin, have invented certain new and useful Improvements in Dirigible Headlights for Automobiles and Analogous Vehicles; and I do hereby declare the following to be a full, clear, and exact description of the invention, such as will enable others skilled in the art to which it appertains to make and use the same.

The primary intent of the present invention is the provision of a headlight for automobiles and motor vehicles generally which will, under all conditions, shed the rays of light in the direction of travel, whether the vehicle is moving in a direct line or deviating therefrom to the right or left, thereby enabling the driver to observe the road so as to minimize the chances for a casualty when passing other vehicles or pedestrians on the road, or making a turn.

The invention also aims to dispose the headlight for protection and to insure its operation in the manner intended, the same having connection with the steering gear and movable therewith to cause the rays of light to follow the direction of the steering wheels, whereby to illuminate the road in advance of the vehicle, whether the same is traveling straight ahead, or making a turn in either direction.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a front view of portion of an automobile, illustrating the application of the invention, Figure 2 is a plan view, Figure 3 is a vertical longitudinal section, and Figure 4 shows a different manner of mounting the headlight.
Corresponding and like parts are referred to in the following description and designated in the several views of the drawings by like reference characters.

The numeral 1 designates the usual drag link or spindle connecting rod. 2 designates a vertical shaft which is externally screw threaded. The shaft 2 is mounted in a bearing 3 near its upper end and is set in a bearing 4 carried by the front axle 5. The upper bearing 3 is applied to the inner lower portion of the fender adjacent the radiator 6 and between the radiator and the front wheel. A headlight 7 is attached to the upper end of the shaft 2.

A T-fitting 8 is mounted upon the threaded portion of the shaft 2 and an arm 9 is threaded into the lateral branch of the T-fitting 8 and its outer end is provided with a series of openings 10, whereby provision is had for a link 11 adjustably connecting the arm 9 with the spindle rod 1. The arm 9 may be adjusted vertically on the shaft 2 and is secured in the adjusted position by screwing it into the lateral branch of the T-fitting 8 until its inner end binds the shaft 2. By having the arm 9 adjustably connected with the shaft 2 and the link 11 adjustably connected with the arm, provision is had for adapting the headlight to different makes of automobiles and motor vehicles generally.

The headlight 7 is auxiliary to the usual side headlights and is mounted in a position to be protected and is preferably disposed in advance of the ordinary side headlights and in such a manner as to throw the rays of light to illuminate the road ahead of the machine, whether the latter is traveling in a direct course or turning to the right or to the left. The arrangement is such that when the front wheels are turned to the right or left, the headlight correspondingly turns so as to shed the rays of light in a direction approximately parallel with the wheels, whereby to light up the road in advance of the vehicle, whether the same is traveling straight ahead, deviating from a straight course, or making a turn.

In Figure 4 the shaft 2 of the headlight 7 is shown mounted in the longitudinal bar 12 of the chassis thereby doing away with the lower bearing 4.

What is claimed is:

In combination with a fender and a side headlight disposed above the same and an axle, a turntable upstanding lamp-carrying shaft, a lamp on said shaft below and auxiliary to the headlights, a fitting screw-threaded on said shaft for adjustment longitudinally thereof, an arm screw-threaded to said fitting at substantially a right angle to the shaft and at one end adapted to bind against the shaft, a steering-gear connecting link extending through the arm to prevent retrograde turning movement thereof relatively to the shaft and fitting, a bearing on said fender for the shaft, a bearing on said axle for the shaft, the latter bearing being directly below and adjustable with respect to the first bearing.

In testimony whereof I affix my signature in presence of two witnesses.

CHARLES A. BEGGS.

Witnesses:
  FRED W. FRANK,
  G. P. LANNON.